United States Patent
Blaisdell et al.

(10) Patent No.: US 10,824,888 B1
(45) Date of Patent: Nov. 3, 2020

(54) IMAGING ANALYSIS TECHNOLOGY TO ASSESS MOVEMENTS OF VEHICLE OCCUPANTS

(71) Applicant: STATE FARM MUTUAL AUTOMOBILE INSURANCE COMPANY, Bloomington, IL (US)

(72) Inventors: Ben Blaisdell, Urbana, IL (US); Yue Liu, Urbana, IL (US); Aditya Subramanian, Cupertino, CA (US); Sripriya Sundararaman, Plano, TX (US); Aaron Scott Chan, Bloomington, IL (US); Utku Pamuksuz, Champaign, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 296 days.

(21) Appl. No.: 15/874,060

(22) Filed: Jan. 18, 2018

Related U.S. Application Data

(60) Provisional application No. 62/448,198, filed on Jan. 19, 2017.

(51) Int. Cl.
*G06K 9/00* (2006.01)
*G06T 7/20* (2017.01)

(52) U.S. Cl.
CPC ..... *G06K 9/00845* (2013.01); *G06K 9/00335* (2013.01); *G06T 7/20* (2013.01); *G06T 2207/30268* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,189,513 A | * | 2/1993 | Sekine | H04N 5/145 348/E5.046 |
| 6,522,768 B1 | * | 2/2003 | Dekhil | G06K 9/00 382/100 |
| 7,715,961 B1 | * | 5/2010 | Kargupta | G06Q 10/08 303/152 |
| 2004/0186642 A1 | * | 9/2004 | Basir | B60R 21/01542 701/45 |
| 2004/0240706 A1 | * | 12/2004 | Wallace | G06T 7/73 382/103 |
| 2005/0196015 A1 | * | 9/2005 | Luo | G06K 9/00234 382/103 |
| 2006/0165276 A1 | * | 7/2006 | Hong | G05D 1/0272 382/153 |
| 2008/0048887 A1 | * | 2/2008 | Aoki | G01S 7/4802 340/937 |

(Continued)

Primary Examiner — Zhiyu Lu
(74) Attorney, Agent, or Firm — Marshall, Gerstein & Borun LLP (57) ABSTRACT

Systems and methods for assessing the movements of a driver while operating the vehicle are provided. According to certain aspects, an electronic device may receive and analyze image data from a 2-D image sensor and a 3-D image sensor, where the image data depicts an individual located within a vehicle. The electronic device may also access a library of baseline movements to which to compare the image data. Based on the comparing, the electronic device may identify and record a set of movements made by the driver.

18 Claims, 7 Drawing Sheets

(56) References Cited

U.S. PATENT DOCUMENTS

| | | | | |
|---|---|---|---|---|
| 2009/0234542 A1* | 9/2009 | Orlewski | ............... | B60N 2/28 |
| | | | | 701/45 |
| 2009/0276092 A1* | 11/2009 | Yoon | ............... | B25J 9/1666 |
| | | | | 700/245 |
| 2010/0239178 A1* | 9/2010 | Osher | ............... | G06T 9/001 |
| | | | | 382/243 |
| 2012/0307011 A1* | 12/2012 | Shikata | ............... | A63F 13/5258 |
| | | | | 348/46 |
| 2013/0216094 A1* | 8/2013 | DeLean | ............... | G06K 9/00335 |
| | | | | 382/103 |
| 2014/0125474 A1* | 5/2014 | Gunaratne | ............... | G08G 1/163 |
| | | | | 340/439 |
| 2014/0226895 A1* | 8/2014 | Babin | ............... | G06K 9/00214 |
| | | | | 382/154 |
| 2014/0226900 A1* | 8/2014 | Saban | ............... | G02B 5/08 |
| | | | | 382/165 |
| 2014/0267420 A1* | 9/2014 | Schowengerdt | ... | G02B 27/0172 |
| | | | | 345/633 |
| 2015/0206002 A1* | 7/2015 | Ponten | ............... | G06T 7/246 |
| | | | | 382/103 |
| 2015/0264258 A1* | 9/2015 | Bervoets | ............... | H04N 7/181 |
| | | | | 348/36 |
| 2016/0007009 A1* | 1/2016 | Offenberg | ............... | H04N 13/254 |
| | | | | 348/46 |
| 2016/0292515 A1* | 10/2016 | Jia | ............... | G06K 9/00369 |
| 2016/0337633 A1* | 11/2016 | Lee | ............... | H04N 5/2226 |
| 2017/0076136 A1* | 3/2017 | Xue | ............... | G06F 3/01 |
| 2017/0228647 A1* | 8/2017 | Brunner | ............... | G06N 7/005 |

\* cited by examiner

IMAGING ANALYSIS TECHNOLOGY TO ASSESS MOVEMENTS OF VEHICLE OCCUPANTS

CROSS-REFERENCE TO RELATED APPLICATIONS

This application claims benefit of the filing date of U.S. Provisional Patent Application No. 62/448,198, filed Jan. 19, 2017 and titled "IMAGING ANALYSIS TECHNOLOGY TO ASSESS MOVEMENTS OF VEHICLE OCCUPANTS," the disclosure of which is hereby incorporated by reference in its entirety.

FIELD

The present disclosure is directed to using image data to determine movements made by vehicle occupants. More particularly, the present disclosure is directed to systems and methods for using 2-D and 3-D imaging to detect and record movements made by vehicle occupants based on a library of known movements.

BACKGROUND

Individuals have been operating and traveling in vehicles as means of transportation for decades. Generally, some drivers exercise more care or caution than do other drivers. In particular, some drivers make movements and gestures that are not related to the act of driving and which can result in the drivers being distracted, which can create dangerous situations for those inside and outside of the vehicle. For example, a driver that is interacting with the center console (e.g., changing the radio station) may not be focused on the road in front of the vehicle. As a result, the driver may brake harder or not brake in time when approaching a stop sign or a red light.

Recently, vehicles have experienced an increased prevalence of electronic devices and sensors capable of sensing and generating data associated with vehicle operation. However, even with this increasing prevalence, there are no existing solutions for determining driver movements and gestures while they are in the act of driving the vehicle. For example, there is no existing solution for determining how often a vehicle operator reaches for a mobile phone or texts on a mobile phone while operating the vehicle. Accordingly, there is an opportunity for systems and methods to leverage image sensor data to identify movements and gestures of vehicle operators.

SUMMARY

In one aspect, a computer-implemented method of using 2-D image sensor data and 3-D image sensor data to determine vehicle occupant movements is provided. The method may include receiving image data from at least one image sensor located within the vehicle; analyzing, by a computer processor, the image data to identify any movements made an operator of the vehicle; and accessing a library of baseline movements to compare with the analysis of the image data. The method may further include recording an indication of a movement made by a vehicle operator.

In another aspect, a system in an electronic device for determining vehicle occupant movements based on 2-D image sensor data and 3-D image sensor data is provided. The system may include a memory configured to store non-transitory computer executable instructions, and a processor configured to interface with the memory. The processor may be configured to execute the non-transitory computer executable instructions to cause the processor to receive image data from at least one image sensor located within the vehicle, analyze, by a computer processor, the image data to identify any movements made an operator of the vehicle; and access a library of baseline movements to compare with the analysis of the image data. The processor may further be configured to record an indication of a movement made by a vehicle operator.

DETAILED DESCRIPTION

The present embodiments may relate to, inter alia, detecting, recording, compiling, comparing, and analyzing a vehicle occupant's movements. It should be appreciated that a "movement" may correspond to any type of gesture, action, maneuver, and/or the like, that may be undertaken, completed, or otherwise made by an occupant of a vehicle. Some examples of such movements by vehicle occupants include reaching for the radio console, using a mobile phone, reaching for the backseat, and turning one's head. Currently, there is no effective way to analyze images to detect a vehicle occupant's movements. The present embodiments describe platforms and techniques to interpret and analyze data contained in images captured using a combination of 2-D and 3-D image sensors.

According to certain aspects, a vehicle or an electronic device within the vehicle may be equipped with one or more sensors, such as one or more image sensors. The image sensor(s) may be configured to capture image data of the occupant of the vehicle and transmit the image data to an electronic device. The data contained in these images can be analyzed, through the use of various algorithms and techniques, to ascertain useful information about a vehicle occupant's movements. The information ascertained from the analysis of the image data can be compared to a stored library of common movements in order to classify a particular movement included in the image data.

Furthermore, the image data can be saved for subsequent access and can be used to create an ongoing log of a vehicle occupant's movements. This data can be saved on an electronic device within the vehicle, a portable electronic device (e.g., a smartphone), or on a remote network or cloud. From this log, a trend of common movements, behaviors, and mannerisms of a certain vehicle occupant can be created.

The image sensors can capture and provide either 2-D or 3-D image data. Each type of image data (i.e., 2-D or 3-D) offers its own advantages and disadvantages. Because of this, the algorithms and techniques behind the image data analysis may be dependent on whether the images include 2-D or 3-D image data. Additionally, other factors favor one type of image over the other. Some of these factors may be brightness (i.e., level of light), heat, and orientation of the vehicle occupant relative to the sensor. In an implementation, the determination of a movement depicted in image data may be based on an analysis of a combination of 2-D image data and 3-D image data.

The systems and methods therefore offer numerous benefits. In particular, systems and methods may increase the safety of vehicle operation. Additionally, the systems and methods may enable individuals to review the recorded movements and analyze this information in an attempt to make various improvements (e.g., reduce a habit that leads to distracted driving). Further, an individual, entity, or the like may access the recorded movements for various purposes or applications. For further example, a parent may access the recorded movements to monitor driving habits of one or more children. It should be appreciated that other benefits are envisioned.

The systems and methods discussed herein address a challenge that is particular to assessing vehicle operation. In particular, the challenge relates to a difficulty in interpreting the multiple types of data associated with operating vehicles. This is particularly apparent with the increasing amount of vehicle sensors and types of data generated therefrom. The systems and methods discussed herein correlate the image sensor data to identify vehicle operator movements, which results in effectively compiled data that may be used for various applications and interpretations. Therefore, because the systems and methods employ the collection, compiling, and storing of data associated with the vehicle and vehicle operator, the systems and methods are necessarily rooted in computer technology in order to overcome the noted shortcomings that specifically arise in the realm of assessing vehicle operation.

Similarly, the systems and methods provide improvements in a technical field, namely, vehicle data compiling. Instead of the systems and methods merely being performed by hardware components using basic functions, the systems of methods employ complex steps that go beyond the mere concept of simply retrieving and combining data using a computer. In particular, the hardware components capture multiple types of image sensor data, analyze the image sensor data, access a library of baseline movement data, and compare the image sensor data to the library of baseline movement data to determine if a certain movement occurred. This combination of elements further impose meaningful limits in that the operations are applied to improve vehicle data compiling by associating multiple types of image sensor data in a meaningful and effective way.

According to implementations, the systems and methods may support dynamic, real-time or near real-time analysis of any captured, received, and/or detected data. In particular, the electronic device may receive or capture image sensor data in real-time or near real-time, and may automatically and dynamically analyze the captured image sensor data. The electronic device may also access a stored library of baseline movement data. In this regard, the individual indicated in the data or accessing the data is afforded the benefit of an accurate and meaningful compilation of data. Further, any individual may access and analyze the data in real-time to efficiently and effectively facilitate any functionalities or processing.

Figure 1A:
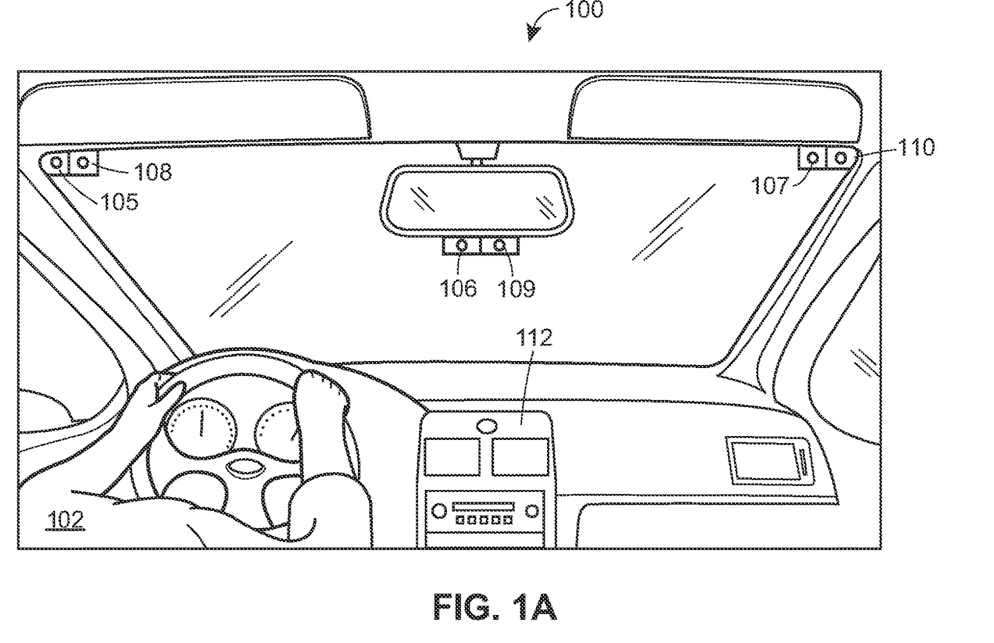
FIGS. 1A and 1B depict exemplary environments within a vehicle including various components configured to facilitate various functionalities, in accordance with some embodiments.

As depicted in FIG. 1A, the interior of the vehicle 100 may support a set of 2-D image sensors 105, 106, 107 and 3-D image sensors 108, 109, 110. In the particular scenario depicted in FIG. 1A, each of the image sensors 105, 107, 108, 110 is located near a top corner of the interior of the vehicle 100 and the image sensors 106, 109 are located below the rear view mirror. Although six (6) image sensors are depicted in FIG. 1A, it should be appreciated that additional or fewer image sensors are envisioned. Further, it should be appreciated that the image sensors 105, 106, 107, 108, 109, 110 may be disposed or located in various alternate or additional portions of the vehicle 100, including on an exterior of the vehicle 100.

Each of the image sensors 105, 106, 107, 108, 109, 110 may be configured to detect and convey information that constitutes an image. In particular, each of the image sensors 105, 106, 107, 108, 109, 110 may generate digital image data and/or video data. Although not depicted in FIG. 1A, the vehicle 100 may also include one or more microphones that may be disposed in one of more locations, where the microphones may be configured to capture audio that may supplement the digital image data captured by the image sensors 105, 106, 107, 108, 109, 110.

The vehicle 100 may also be configured with an electronic device 112 configured with any combination of software and hardware components. In some implementations, the electronic device 112 may be included as part of an on-board diagnostic (OBD) system or any other type of system configured to be installed in the vehicle 100, such as an original equipment manufacturer (OEM) system. The electronic device 112 may include a set of sensors configured to detect and record various telematics data associated with the vehicle 100. In some implementations, the electronic device 112 may be configured to communicate with (i.e., request, retrieve, or receive data from) a set of sensors disposed in other locations of the vehicle 100, such as each of the image sensors 105, 106, 107, 108, 109, 110. Further, in some implementations, the electronic device 112 itself may be equipped with one or more image sensors.

Figure 1B:
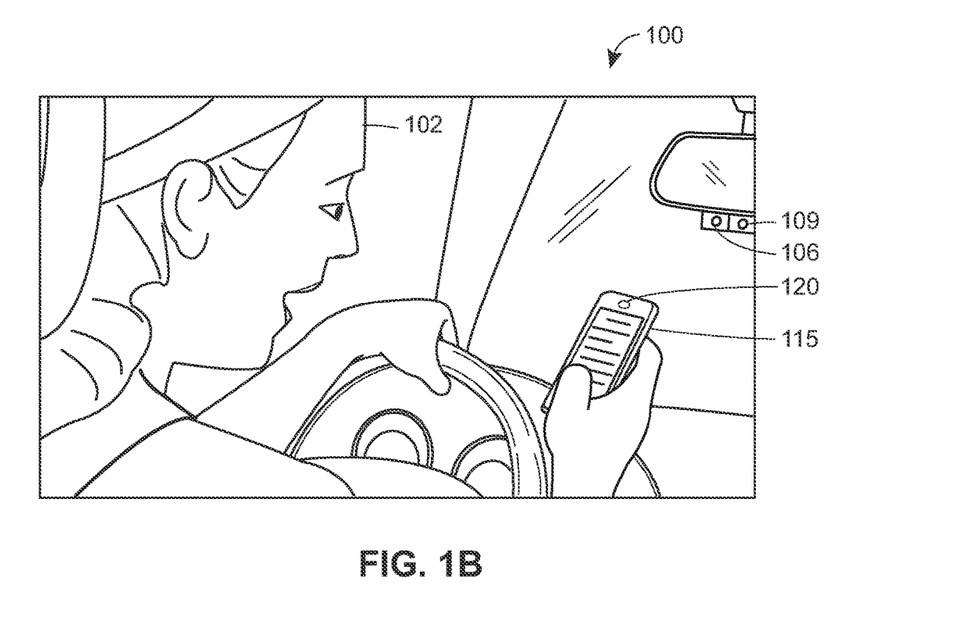

FIG. 1B depicts another configuration of an interior of the vehicle 100 that may include various components associated with the systems and methods. Similar to the depiction of FIG. 1A, the depiction of FIG. 1B illustrates the individual 102 who may be an operator or a passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electrical device 115. For example, the electronic device 115 may be secured within in a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, biometric, and/or other types of sensors.

In some implementations, the electronic device 115 may be configured to interface with additional components of the vehicle 100. In particular, the electronic device 115 may interface with the electronic device 112 and sensors thereof, any of the image sensors 105, 106, 107, 108, 109, 110 and/or other components of the vehicle 100, such as any additional sensors that may be disposed within the vehicle 100. Further, although not depicted in FIG. 1A or 1B, the vehicle 100 and/or each of the electronic devices 112, 115 may be equipped with storage or memory capable of storing various data.

In operation, either the electronic devices 112, 115 may be configured to receive or otherwise access image data captured by any combination of the image sensors 105, 106, 107, 108, 109, 110, 120. The electronic devices 112, 115 may access user profile data that may be stored in the storage or memory, and may compare the received image data to the user profile data to identify the individual 102 who may be depicted in the image data.

Figure 2:
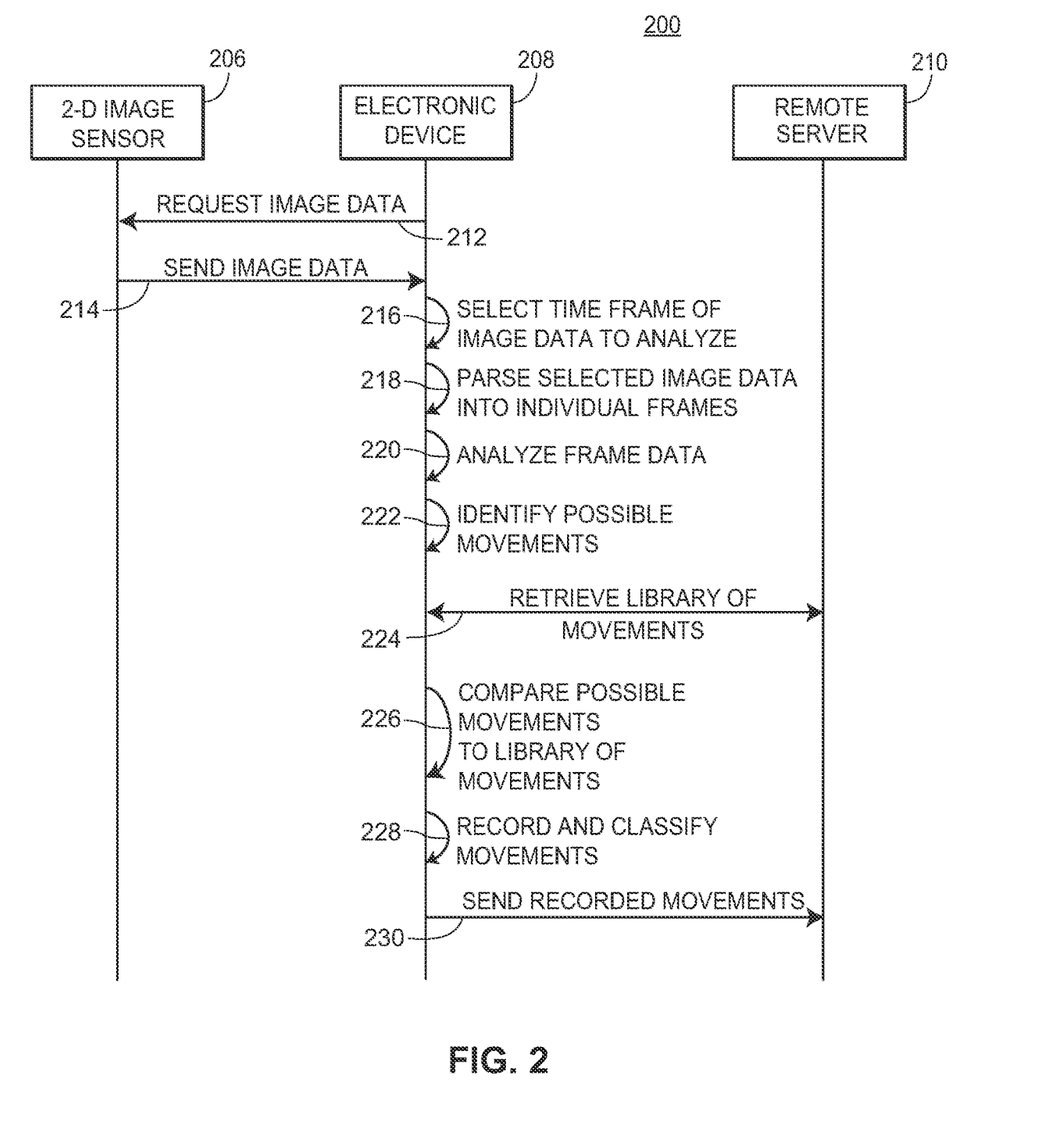
FIG. 2 depicts an exemplary signal diagram associated with analyzing 2-D image sensor data to identify vehicle operator movements, in accordance with some embodiments.

FIG. 2 depicts a signal diagram 200 associated with facilitating certain functionalities associated with the systems and methods. The signal diagram 200 includes a set of components that may be associated with a vehicle: a 2-D image sensor 206 (such as one of the image sensors 105, 106, 107, 120 as discussed with respect to FIGS. 1A and 1B), an electronic device 208 (such as one of the electronic devices 112, 115 as discussed with respect to FIGS. 1A and 1B), and a remote server 210. According to embodiments, the 2-D image sensor 206 may be a component of (or separate from) the electronic device 208.

The signal diagram 200 may begin when the electronic device 208 optionally requests (212) image data from the 2-D image sensor 206. According to embodiments, the electronic device 208 may automatically request the image data periodically (e.g., once every ten seconds, once every minute, once every hour), a user of the electronic device 208 may cause the electronic device 208 to request image data, or another trigger (such as a motion sensor) could cause the electronic device 208 to request image data. Further, the request may include a specified amount of image data and/or a specific time component (e.g., real time image(s), real-time video, image(s) and/or video recorded five minutes ago). It should be appreciated that the 2-D image sensor 206 may be internal to or external from the electronic device 208.

The 2-D image sensor 206 may capture and send (214) the image data to the electronic device 208. In one implementation, the 2-D image sensor 206 may automatically send the image data to the electronic device 208 in real-time or near real-time as the 2-D image sensor 206 captures the image data, and/or in response to a request from the electronic device 208. In another implementation, the 2-D image sensor 206 may send previously captured image data to the electronic device 208, such as if the 2-D image sensor 206 interfaces with some type of memory or storage. It should be appreciated that the image data may depict a vehicle operator or a passenger of the vehicle.

The electronic device 208 may select (216) a certain timeframe or portion of image data to analyze. In one implementation, the electronic device 208 or another trigger (e.g., a user of the electronic device 208 or a motion sensor) may select the same timeframe or portion of image data to analyze. In another implementation, the electronic device 208 or another trigger (e.g., a user of the electronic device 208 or a motion sensor) may select a specific start time and stop time for the image data to be analyzed.

The image data that the 2-D image sensor 206 sends to the electronic device 208 may be in the form of video data that may include multiple frames of image data. In this situation, after the electronic device 208 selects a portion of the video data to be analyzed (for example based on the previously-described implementations), the electronic device 208 may parse (218) the video data into individual frames so that the electronic device 208 may analyze (220) the image data contained in each frame and compare the image data of the frames.

The electronic device 208 may analyze (220) the 2-D image data using one or more software algorithms, techniques, calculations, and/or the like. In analyzing the 2-D image data, the electronic device 208 may identify (222) if there are any possible movements that may be depicted in the 2-D image data. Generally, in 2-D image data, movements that occur in directions perpendicular (side-to-side) to the direction in which the 2-D image sensor is pointing may be more easily identified than movements that occur in directions parallel (back-and-forth) to the direction in which the 2-D image sensor is pointing. In contrast, 3-D images may more readily depict movements that occur in directions parallel to the direction in which a 3-D sensor is pointing, functionality which will be discussed later.

In one implementation, the electronic device 208 may retrieve (224) a library of movements from the remote server 210 via a network(s). In another implementation, the electronic device 208 may retrieve a library of movements locally stored on the memory of the electronic device 208. In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. In another implementation, the electronic device 208 may locally store and access the library of movements.

The electronic device 208 may compare (226) the library of movements retrieved from the remote server 210 (or accessed locally) with any movements that were identified from the 2-D image data. In particular, the electronic device 208 may analyze differences and similarities of characteristics indicated in the identified movements with movements included in the library of movements, where the characteristics may include movement(s) of specific body parts (e.g., right arm), direction(s) of movement(s), and distance(s) of movement(s). In embodiments, direction(s) and distance(s) of movement(s) may be defined by changes in pixel signals, where the direction of movement may be determined by analyzing the changes in pixel signal over a portion of the 2-D image sensor data indicating movement in a particular direction. The distance of this movement can be determined by analyzing the same 2-D image sensor data from when the movement starts (e.g., first record of change in pixel signal) to when the movement ends (e.g., last record of change in pixel signal). For example, if the vehicle operator wants to change something on the center console (e.g., change the radio station, change the temperature in the vehicle, etc.) the vehicle operator's right arm would extend forward and to the right to reach the center console. As mentioned earlier, it is more likely for the 2-D image sensor to detect movement perpendicular (side-to-side) to the direction in which the 2-D image sensor is pointing. In this example, the analysis of the 2-D image sensor data would determine that the direction of the movement was from the left to right because the changes in pixel signals will start on the left and move to right, and the analysis of the distance of the movement would begin when the right arm first starts moving and would stop once the front console is reached and the movement stops. Therefore, the determination of the direction and distance from the 2-D image sensor data may be made mostly in the plane perpendicular to the direction in which the 2-D image sensor is pointing.

Based on the comparison, the electronic device 208 may determine whether any movements identified from the image data match with a particular movement contained in the library of movements. In particular, the electronic device 208 may calculate a score or metric for a given identified movement, for example based on the locations of objects depicted in the image data. Further, the electronic device 208 may calculate or access a set of scores or metrics for the movements included in the library of movements, for example based on the locations of objects or other data associated with the library of movements. The electronic device 208 may compare the score of the given identified movement with the set of scores corresponding to the library of movements. If the difference between the scores is within a threshold value, then the electronic device 208 may deem that the given identified movement is similar to the corresponding movement included in the library of movements.

In an implementation, because individuals have unique shapes and sizes bodies, the electronic device 208 may incorporate a certain level of normalization when determining similarities between movements.

After the comparison analysis is complete, if there is a match (e.g., more similarities than differences between the identified movement and the library of movements) the electronic device 208 may record and classify (228) any movements identified from the set of 2-D images that match movements included in the library of movements (e.g., reaching for a mobile device). The electronic device 208 can either store records of the match(es) on some type of internal memory or storage within the device, send (230) records of the match(es) to the remote server (210), or do both.

Figure 3:
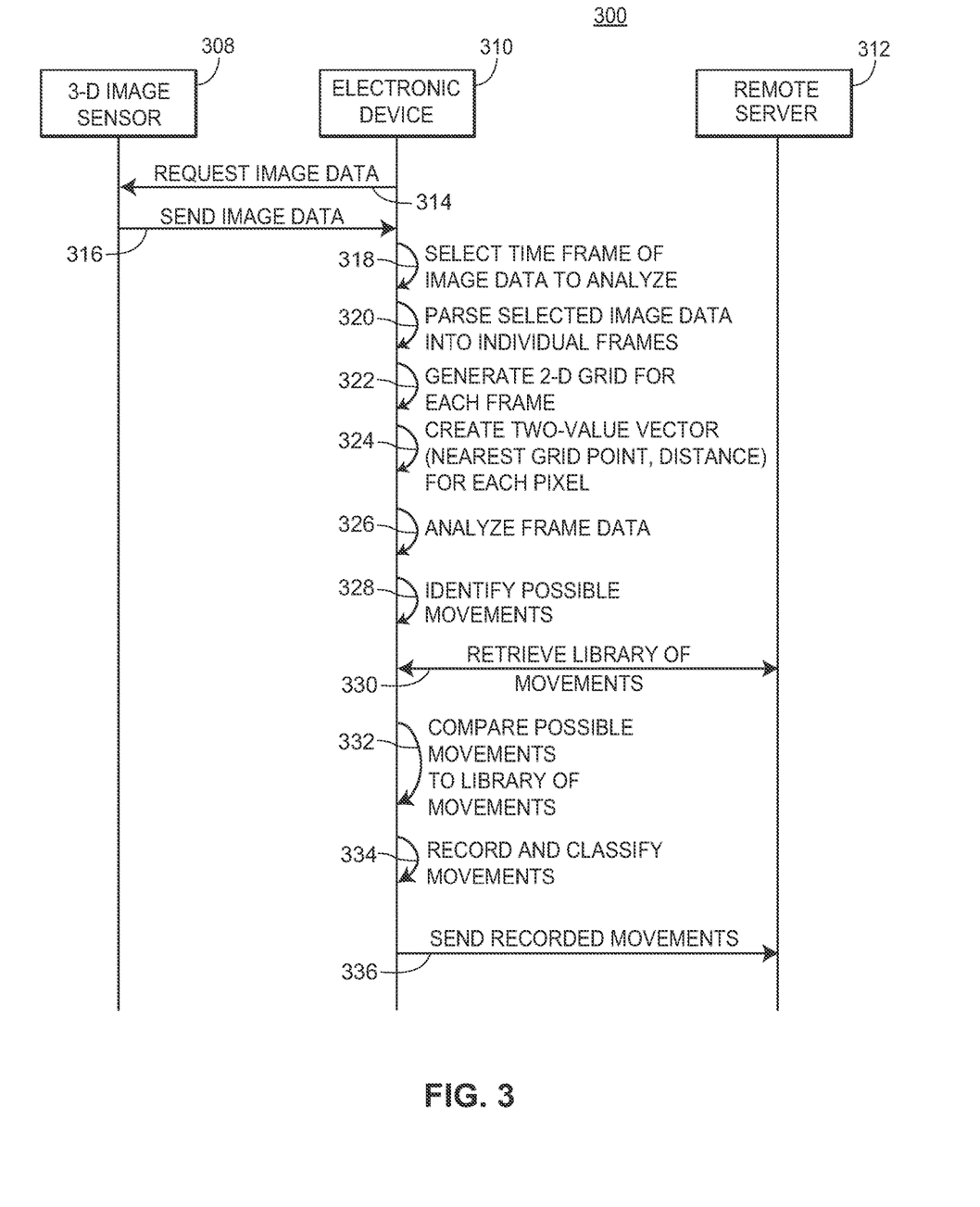
FIG. 3 depicts an exemplary signal diagram associated with analyzing 3-D image sensor data to identify vehicle operator movements, in accordance with some embodiments.

FIG. 3 depicts a signal diagram 300 associated with facilitating certain functionalities associated with the systems and methods. The signal diagram 300 includes a set of components that may be associated with a vehicle: a 3-D image sensor 308 (such as one of the image sensors 108, 109, 110, 120 as discussed with respect to FIGS. 1A and 1B), an electronic device 310 (such as one of the electronic devices 112, 115 as discussed with respect to FIGS. 1A and 1B), and a remote server 312. According to embodiments, the 3-D image sensor 308 may be a component of (or separate from) the electronic device 310.

The signal diagram 300 may begin when the electronic device 310 optionally requests (314) image data from the 3-D image sensor 308. According to embodiments, the electronic device 310 may automatically request the image data periodically (e.g., once every ten seconds, once every minute, once every hour), a user of the electronic device 310 may cause the electronic device 310 to request image data, or another trigger (such as a motion sensor) could cause the electronic device 310 to request image data. Further, the request may include a specified amount of image data and/or a specific time component (e.g., real time image(s), real-time video, image(s) and/or video recorded five minutes ago). It should be appreciated that the 3-D image sensor 308 may be internal to or external from the electronic device 310.

The 3-D image sensor 308 may capture and send (316) the image data to the electronic device 310. In one implementation, the 3-D image sensor 308 may automatically send the image data to the electronic device 310 in real-time or near real-time as the 3-D image sensor 308 captures the image data, and/or in response to a request from the electronic device 310. In another implementation, the 3-D image sensor 308 may send previously captured image data to the electronic device 310, such as if the 3-D image sensor 308 interfaces with some type of memory or storage. It should be appreciated that the image data may depict a vehicle operator or a passenger of the vehicle.

The electronic device 310 may select (318) a certain timeframe or portion of image data to analyze. In one implementation, the electronic device 310 or another trigger (e.g., a user of the electronic device 310 or a motion sensor) may select the same timeframe or portion of image data to analyze. In another implementation, the electronic device 310 or another trigger (e.g., a user of the electronic device 310 or a motion sensor) may select a specific start time and stop time for the image data to be analyzed.

The image data that the 3-D image sensor 308 sends to the electronic device 310 may be in the form of video data that may include multiple frames of image data. In this situation, after the electronic device 310 selects a portion of the video data to be analyzed (for example based on the previously-described implementations), the electronic device 310 may parse (320) the video data into individual frames in order to generate a 2-D grid for each frame and a two-value vector for each pixel of each frame (322 and 324) (see explanation of FIG. 4). The electronic device 310 may then analyze (326) and compare the 2-D grid and two-value vector data of the frames.

The electronic device 310 may analyze (326) the 3-D image data using one or more software algorithms, techniques, calculations, and/or the like. In analyzing the 3-D image data, the electronic device 310 may identify (328) if there are any possible movements that may be depicted in the 3-D image data. Generally, in 3-D images, movements that occur in directions parallel (back-and-forth) to the direction in which the 3-D image sensor is pointing may be more easily identified than movements that occur in directions perpendicular (side-to-side) to the direction in which the 3-D image sensor is pointing. The reasoning for this will be discussed later when the operation of the 3-D image sensor is explained in more detail.

In one implementation, the electronic device 310 may retrieve (330) a library of movements from the remote server 312 via a network(s). In another implementation, the electronic device 310 may retrieve a library of movements locally stored on the memory of the electronic device 310. In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. In another implementation, the electronic device 310 may locally store and access the library of movements.

The electronic device 310 may compare (332) the library of movements retrieved from the remote server 312 (or accessed locally) with any movements that were identified from the 3-D image data. In particular, the electronic device 310 may analyze differences and similarities of characteristics indicated in the identified movements with movements included in the library of movements, where the characteristic may include movement(s) of specific body parts (e.g., right arm), direction(s) of movement(s), and distance(s) of movement(s). In embodiments, the direction(s) and distance(s) of movement(s) may be defined by changes in pixel signals, where the direction of movement may be determined by analyzing the changes in pixel signals over a portion of the 3-D image sensor data indicating movement in a particular direction. The distance of this movement can be determined by analyzing the same 3-D image sensor data from when the movement starts (e.g., first record of change in pixel signal) to when the movement ends (e.g., last record of change in pixel signal). For example, if the vehicle operator wants to change something on the center console (e.g., change the radio station, change the temperature in the vehicle, etc.) the vehicle operator's right arm would extend forward and to the right to reach the center console. As mentioned earlier, it is more likely for the 3-D image sensor to detect movement parallel (back-and-forth) to the direction in which the 3-D image sensor is pointing. In this example, the analysis of the 3-D image sensor data would determine the direction of the movement was in the forward direction (i.e., towards the center console) since the changes in pixel signals will start on the left and move to right and the analysis of the distance of the movement would begin when the right arm first starts moving and would stop once the front console is reached and the movement stops. Therefore, the analysis of determining direction and distance from the 3-D image sensor data is mostly in the plane parallel to the direction in which the 3-D image sensor is pointing. A more detailed explanation how 3-D image sensor data is analyzed to determine vehicle occupant movements is provided in the explanation of FIG. 5.

Based on the comparison, the electronic device 310 may determine whether any movements identified from the image data match with a particular movement contained in the library of movements. In particular, the electronic device 310 may calculate a score or metric for a given identified movement, for example based on the locations of objects depicted in the image data. Further, the electronic device 310 may calculate or access a set of scores or metrics for the movements included in the library of movements, for example based on the locations of objects or other data associated with the library of movements. The electronic device 310 may compare the score of the given identified movement with the set of scores corresponding to the library of movements. If the difference between the scores is within a threshold value, then the electronic device 310 may deem that the given identified movement is similar to the corresponding movement included in the library of movements.

In an implementation, because individuals have unique shapes and sizes of bodies, the electronic device 310 may incorporate a certain level of normalization when determining similarities between movements.

After the comparison is complete, if there is a match (e.g., more similarities than differences between the identified movement and the library of movements), the electronic device 310 may record and classify (334) any movements identified from the set of 3-D images that match movements included in the library of movements (e.g., reaching for a mobile device). The electronic device 310 can either store records of the match(es) on some type of internal memory or storage within the device, send (336) records of the match(es) to the remote server (312), or do both.

Figure 4:
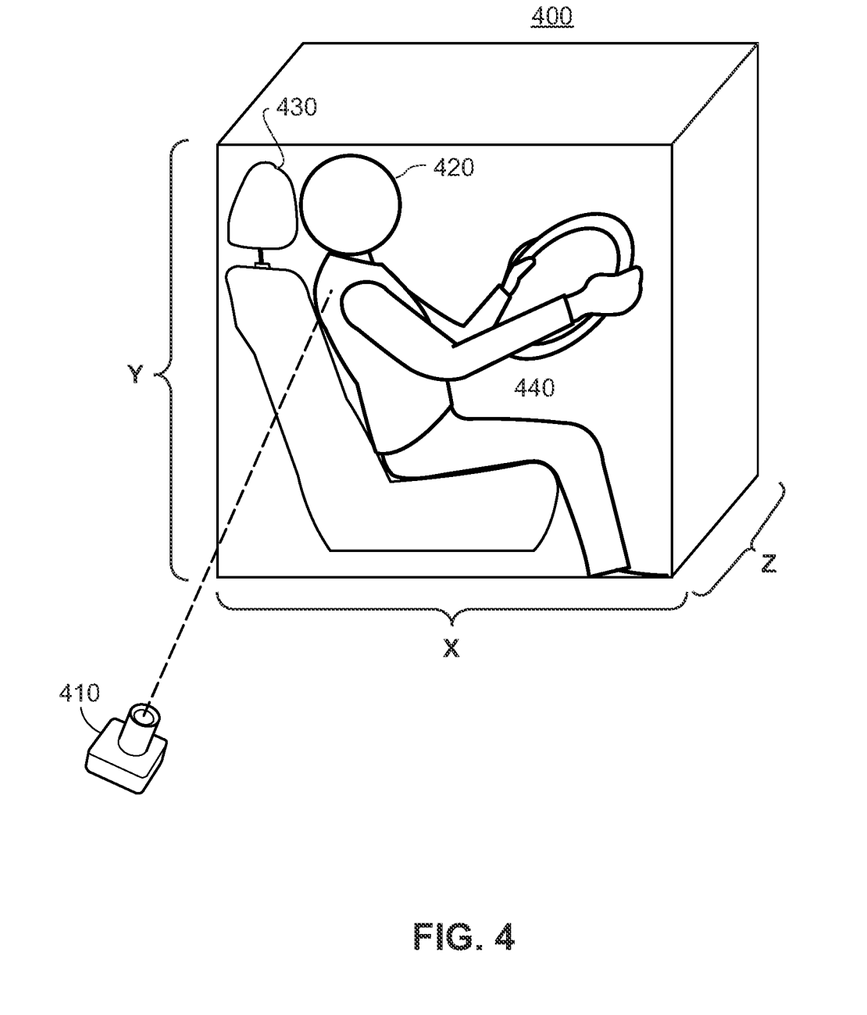
FIG. 4 depicts an exemplary 3-D image sensor orientation and setup with respect to the vehicle occupant, in accordance with some embodiments.

FIG. 4 is a diagram of an interior of a vehicle 400. In the implementation depicted in FIG. 4, a 3-D image sensor 410 is positioned to the side of a vehicle occupant 420 (similar to the position of the 3-D image sensor 110 in FIG. 1A). The vehicle occupant 420 may be the operator of the vehicle and may be seated on a seat 430 with empty or stationary space 440 surrounding the seat 430. The depicted X, Y, and Z axes may be specifically defined for the position of the 3-D image sensor 410 as depicted in FIG. 4. In other implementations, the 3-D image sensor 410 may be positioned in other locations (e.g., in front of the vehicle occupant 420). As shown, the X and Y axes are perpendicular to the direction in which the 3-D image sensor 410 is pointing and the Z axis is parallel to the direction in which the 3-D image sensor 410 is pointing.

According to embodiments, the 3-D image sensor 410 may be configured to detect movements of objects located a distance away from the 3-D image sensor 410. Although the 3-D image sensor 410 can detect movement in any direction (X, Y, and Z axes), in particular, it may detect back-and-forth (Z-axis) movements of the vehicle occupant 420 with respect to the direction the 3-D image sensor 410 is pointing.

Figure 5:
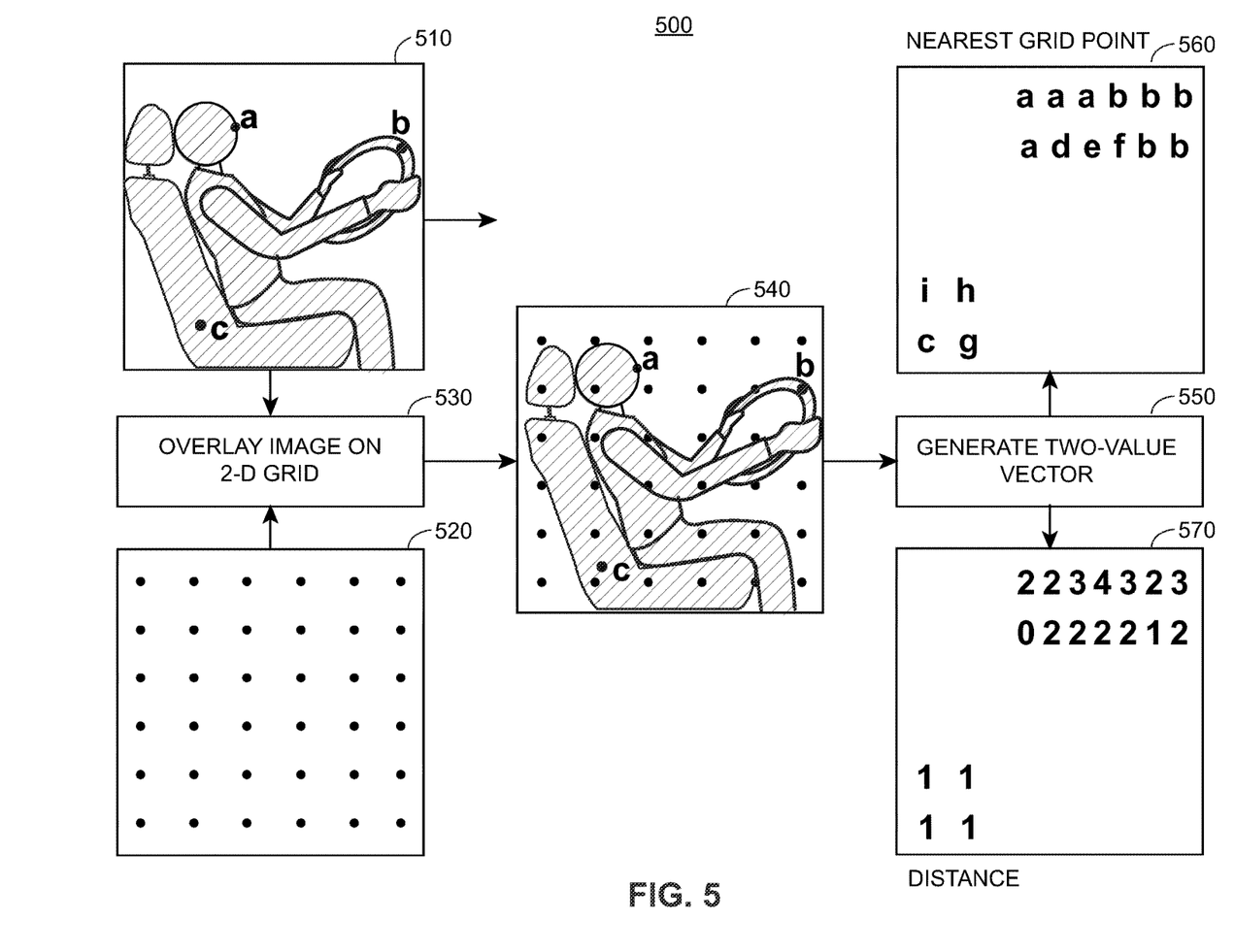
FIG. 5 depicts a flow diagram associated with analyzing image sensor data, in accordance with some embodiments.

FIG. 5 is a diagram 500 including various illustrations associated with 3-D image data. Each of the illustrations in the diagram 500 are snapshots of the 2-D X,Y plane from FIG. 4. The 3-D image sensor is pointing in the Z-axis which would be into the page with respect to the illustrations in the diagram 500.

Illustration 510 depicts a representation of the vehicle occupant's position inside the vehicle with respect to the position of the 3-D image sensor 410 in FIG. 4. Three (3) points are defined in illustration 510 and these three (3) points will be used as a reference throughout the description of diagram 500. Point "a" is a point on the vehicle occupant's head, point "b" is a point on the steering wheel, and point "c" is a point on the vehicle's seat. In this implementation, the white space (i.e., everything that is not part of the vehicle occupant, steering wheel, or driver's seat) is empty or stationary space.

Illustration 520 shows a 2-D grid of evenly spaced points that is overlaid (530) onto the illustration 510 to create illustration 540. A 2-D grid is overlaid onto the 3-D image because each 3-D image could have a different number of data points. The number of data points may also vary from person to person. Accordingly, the overlaying functionality enables the same 2-D grid to be overlaid onto the 3-D image, resulting in a standard number of data points. Illustration 540 is then used to generate (550) a two-value vector that will be used to create a 3-D image. The two-value vector consists of a value for the nearest grid point 560 and a distance 570. A unique two-value vector is assigned to every pixel of an image in order to create a 3-D image.

The nearest grid point value of the two-value vector is determined by taking the value of the nearest pixel that is defined by an object (i.e., not in empty space). An example of this is point "b" that corresponds to a pixel on the steering wheel in illustration 540. The space above and to the right of pixel "b" in illustration 540 is empty space. Therefore, the values of the grid points in the top right corner of illustration 560 all have the value of "b" since that is the nearest pixel to those grid points. This same technique applies to pixel "a" on the head of vehicle occupant. Grid points "e" and "f" in illustration 560 represent pixels on or in the empty space surrounding the head of the vehicle occupant and the steering wheel respectively. Grid points "c", "g", "h", and "i" all represent pixels that are on the seat. In embodiments, the grid point values may represent a unique point in space separate from representing brightness, contrast, signal, etc., as the grind point values may represent for a 2-D image sensor.

The distance value of the two-value vector is determined by assigning each grid point a numerical value that corresponds to that grid point's distance from the 3-D image sensor. The lower the distance value is, the closer to the 3-D image sensor that point is. Points that are further away from the 3-D image sensor or in blank space have higher distance values. For example, while there are five (5) grid points in the upper right corner of illustration 560 that have the "b" grid point value, these same points have different distance values in illustration 570. In particular, the distance values of the five (5) pixels having the "b" grid point value are: 3, 2, 3, 1, and 2. The points that have the "b" value but are not actually on the steering wheel all have larger distance values (greater than 1) because they are further away from the 3-D image sensor than the point "b" that is actually on the steering wheel with a distance value of 1. This is similar for point "a" as well. For point "c" all of the points around it have low distance values that are the same because the pixels correspond to points on the seat and each point on the seat is the same or similar distance from the image sensor.

In an implementation, the 3-D image sensor may calculate a distance by projecting an array of infrared dots and receiving a brightness of the returned dots, where the brightness of the returned dots indicates respective distances. In this implementation, closer objects may return a brighter dot while objects further away may return dimmer dots.

Figure 6:
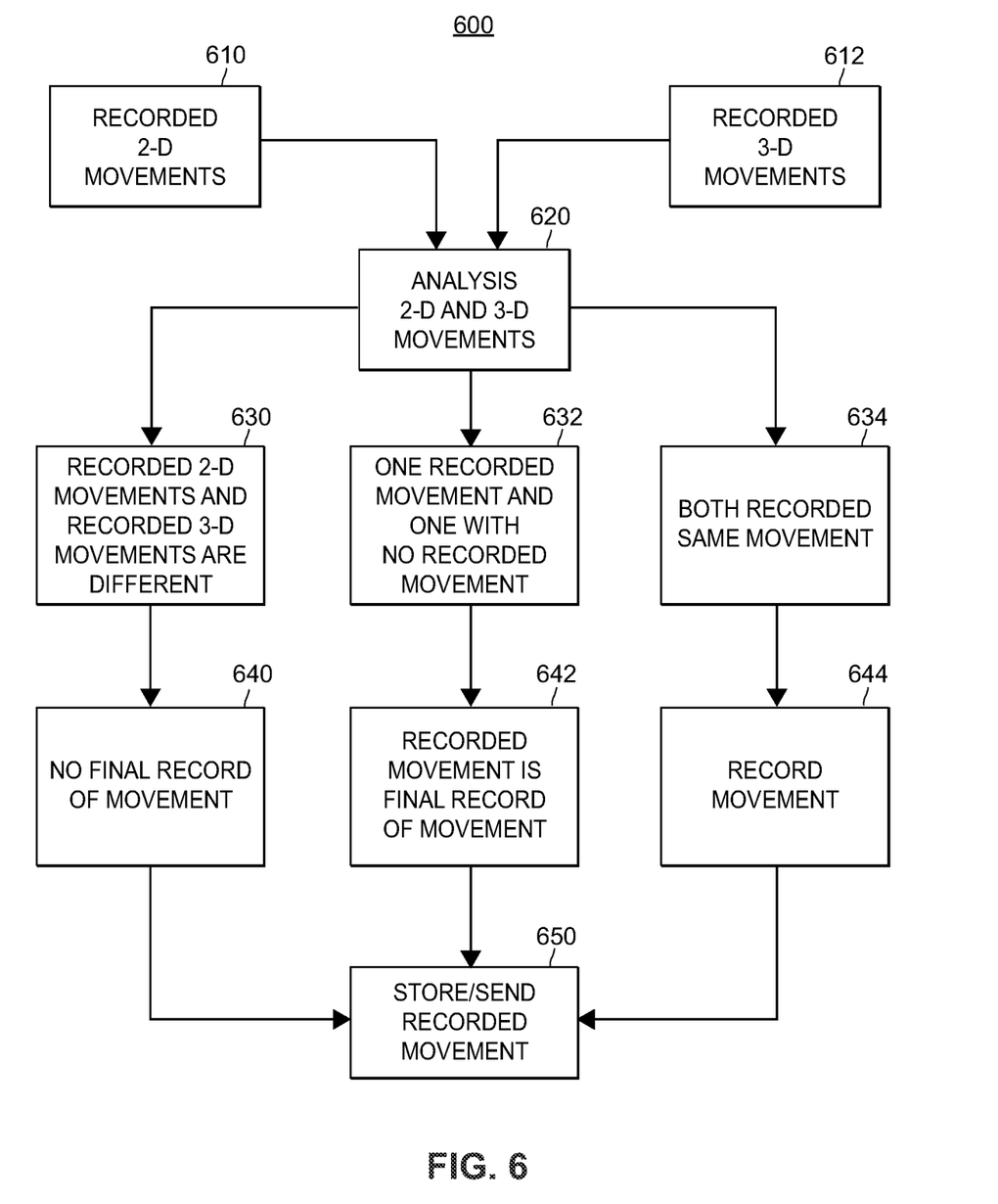
FIG. 6 depicts a block diagram associated with analyzing image sensor data, in accordance with some embodiments.

FIG. 6 is a diagram 600 that explains what happens after the 2-D and 3-D image processing are completed for the same timeframe. In particular, the outcomes of the recorded 2-D movements 610 (from FIG. 2) and the recorded 3-D movements 612 (from FIG. 3) are analyzed 620 together, which may result in three potential scenarios. In the first potential scenario, if the outcome of the recorded 2-D movement(s) 610 and the recorded 3-D movement(s) 612 result in two different recorded movement(s) (630), then there may be no final record of a specific movement(s) made (640). An example of this scenario is if the recorded 2-D movement 610 is the right arm reaching for the center console and the recorded 3-D movement 612 is the left arm reaching for the center console. In this example, no final record of movement would be recorded because the recorded movements are not the same. In the second potential scenario, if one out of the 2-D image sensor and 3-D image sensor recorded a movement(s) and the other sensor did not record any movement(s) (632), then the final record of a specific movement(s) may be based on the image sensor that recorded a movement(s) (642). An example of this scenario is if the recorded 2-D movement 610 is the right arm reaching for the center console and there is no recorded 3-D movement. In this example, the final recorded movement would be the recorded 2-D movement 610. In the third potential scenario, if the recorded movement(s) for both the 2-D image sensor and the 3-D image sensor are the same (634), then the final record is the movement(s) recorded by the two image sensors (644). An example of this is if both the 2-D and 3-D recorded movements are the right arm reaching for the center console, in which case the final recorded movement would be the right arm reaching.

The final recorded movement will be stored on some type of internal memory or storage within the electronic device, sent to a remote server to be recorded, or both (650).

Figure 7:
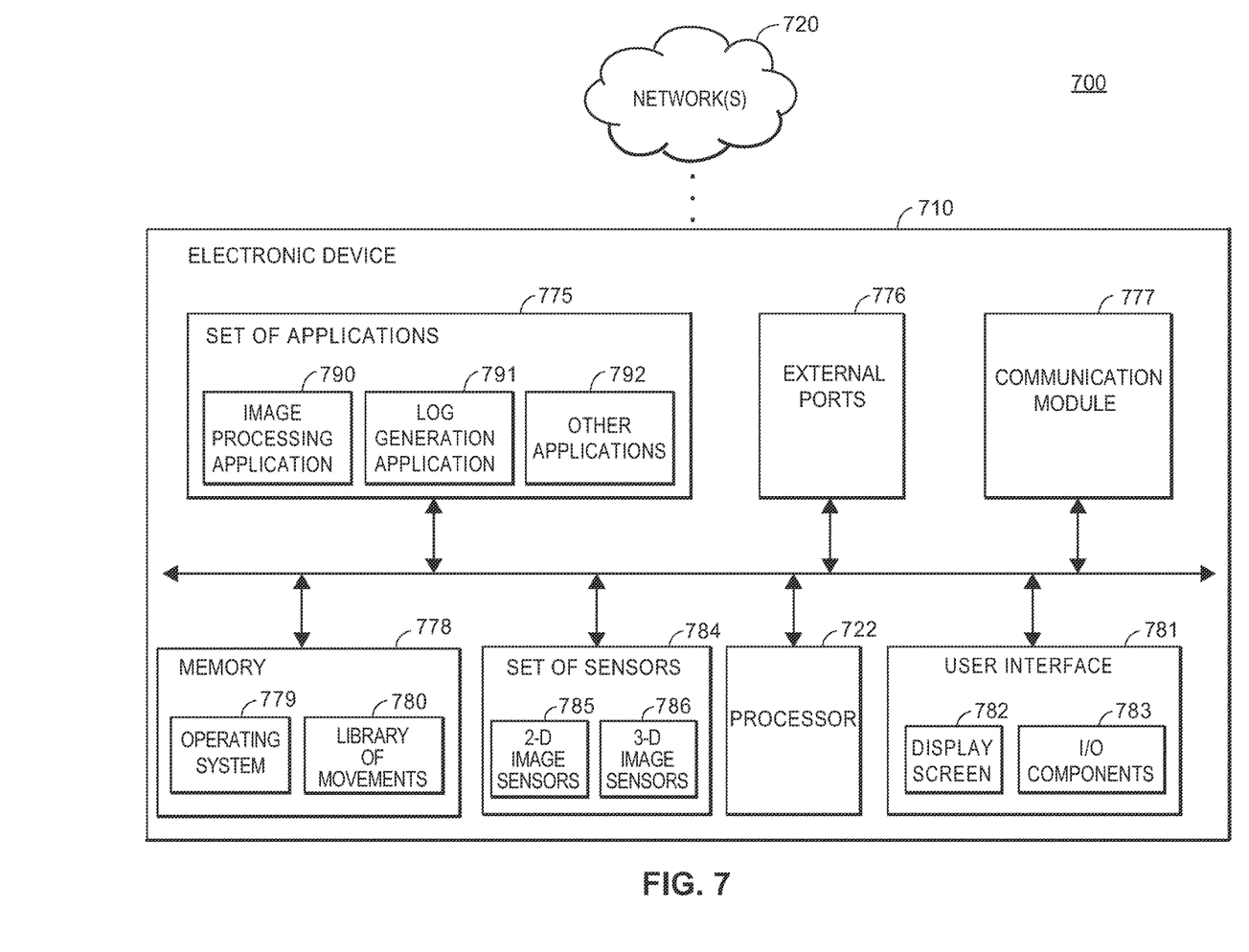
FIG. 7 is a block diagram of an exemplary electronic device, in accordance with some embodiments.

FIG. 7 illustrates a diagram 700 of an exemplary mobile or other electronic device 710 (such as one of the electronic devices 112, 115 as discussed with respect to FIG. 1) in which the functionalities as discussed herein may be implemented. It should be appreciated that the electronic device 710 may be configured to be transported in a vehicle and/or connect to an on-board telematics platform of the vehicle, as discussed herein. Further, it should be appreciated that the electronic device 710 may be integrated into an on-board system of the vehicle. In some implementations, the electronic device 710 may be included as part of a remote server (such as the remote server 210 as discussed with respect to FIG. 2).

The electronic device 710 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be an image processing application 790 configured to analyze image data to identify vehicle operator movements depicted in the image data, and a log generation application 791 configured to generate a log of recorded movements. It should be appreciated that one or more other applications 792 are envisioned.

The processor 772 may interface with the memory 778 to execute the operating system 779 and the set of applications 775. According to some embodiments, the memory 778 may also include a library of baseline movements 780 that include characteristics of common movements. In some implementations, the image processing application 790 may interface with the library of baseline movements 780 to retrieve the library of baseline movements in order to compare it with the processed image sensor data. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 710 may further include a communication module 777 configured to communicate data via one or more networks 720. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. Further, the communication module 777 may include a short-range network component (e.g., an RFID reader) configured for short-range network communications. For example, the communication module 777 may receive, via the network 720, image data from a set of image sensors. For further example, the communication module 777 may transmit data to and receive data from a remote server via the network 720.

The electronic device 710 may further include a set of sensors 784. The processor 722 and the set of applications 775 may interface with the set of sensors 784 to retrieve and process the corresponding sensor data. The set of sensors 784 may include one or more 2-D image sensors 785 and one or more 3-D image sensors 786. In one particular implementation, the log generation application 791 may use various data from the set of sensors 784 to generate logs of recorded movements. Further, in an implementation, the electronic device 710 may interface with one or more 2-D and 3-D image sensors that may be external to the electronic device 710.

The electronic device 710 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs, speakers, microphones). According to some embodiments, the user may access the electronic device 710 via the user interface 781 to review information and/or perform other functions. In some embodiments, the electronic device 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 772 (e.g., working in connection with the operating system 779) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following texts set forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method in an electronic device of assessing vehicle occupant movements, the method comprising:
   receiving 2-D image sensor data from at least one 2-D image sensor located within a vehicle, the 2-D image sensor data depicting an individual located within the vehicle;
   receiving 3-D image sensor data from at least one 3-D image sensor located within the vehicle, the 3-D image sensor data depicting the individual located within the vehicle;
   analyzing, by one or more computer processors, the 2-D image sensor data and the 3-D image sensor data;
   generating, based on the analyzing, processed data representing a combination of the 2-D image sensor data and the 3-D image sensor data, including:
      overlaying a 2-D grid onto each 3-D sensor image included in the 3-D image sensor data to standardize a number of data points for each 3-D sensor image, the overlaying resulting in a set of grid points,
      determining, for each grid point of the set of grid points, a nearest grid point value that represents the nearest pixel that is defined by an object,
      determining, for each grid point of the set of grid points, a distance value that represents a distance the corresponding grid point is from the 3-D image sensor, and
      creating, for each grid point of the set of grid points, a two-value vector comprising the nearest grid point value and the distance value;
   accessing, by the one or more computer processors, a library of movement data comprising a set of movements each having baseline data;
   comparing, by the one or more computer processors, the processed data to the baseline data of the set of movements;
   determining, based on the comparing, that at least a portion of the processed data is similar to the baseline data of one of the set of movements; and
   deeming, based on the determining, that the one of the set of movements was made by the individual.

2. The computer-implemented method of claim 1, wherein analyzing the 2-D image sensor data and the 3-D image sensor data comprises:
   determining a distance and a direction of a set of possible movements depicted in the 2-D image sensor data and the 3-D image sensor data.

3. The computer-implemented method of claim 1, wherein generating the processed data further includes:
   defining changes in signals from a set of pixels and a set of frames included in the 2-D image sensor data and the 3-D image sensor data; and
   determining, based on the changes in signals, (i) a set of movements, (ii) a set of directions corresponding to the set of movements, and (iii) a set of distances corresponding to the set of movements.

4. The computer-implemented method of claim 1, wherein determining the distance value comprises:
   projecting an array of infrared dots onto a field-of-view of the 3-D image sensor;
   detecting returned infrared light generated by the 3-D image sensor; and measuring a brightness of the returned infrared light to determine the distance value.

5. The computer-implemented method of claim 1, wherein accessing the library of movement data comprising the set of movements each having the baseline data comprises:
   locally retrieving, from memory, the library of movements; or
   retrieving the library of movements from a remote server via network connection.

6. The computer-implemented method of claim 1, wherein comparing the processed data to the baseline data of the set of movements comprises:
   determining, from the processed data, an image pattern indicative of a potential movement; and
   comparing the image pattern indicative of the potential movement to the baseline data of the set of movements.

7. The computer-implemented method of claim 6, wherein determining that at least the portion of the processed data is similar to the baseline data of the one of the set of movements comprises:
   calculating a metric for the image pattern indicative of the potential movement;
   normalizing the metric to compensate for differences in at least one detected object; and
   determining that the normalized metric is within a threshold value of a baseline metric, from the baseline data, of the one of the set of movements.

8. The computer-implemented method of claim 1, wherein deeming that the one of the set of movements was completed by the individual comprises:
   recording, in memory, an indication of the one of the set of movements.

9. The computer-implemented method of claim 8, further comprising:
   sending, to a server via a network connection, the indication of the one of the set of movements.

10. A system to assess vehicle occupant movement within a vehicle comprising:
    a 2-D image sensor located within the vehicle;
    a 3-D image sensor located within the vehicle;
    a memory configured to store non-transitory computer executable instructions; and
    a processor interfacing with the 2-D image sensor, the 3-D image sensor, and the memory, wherein the processor is configured to execute the non-transitory computer executable instructions to cause the processor to:
       receive 2-D image sensor data from the 2-D image sensor, the 2-D image sensor data depicting an individual located within the vehicle,
       receive 3-D image sensor data from the 3-D image sensor, the 3-D image sensor data depicting the individual located within the vehicle,
       analyze the 2-D image sensor data and the 3-D image sensor data,
       generate, based on the analyzing, processed data representing a combination of the 2-D image sensor data and the 3-D image sensor data, including:
          overlaying a 2-D grid onto each 3-D sensor image included in the 3-D image sensor data to standardize a number of data points for each 3-D sensor image, the overlaying resulting in a set of grid points,
          determining, for each grid point of the set of grid points, a nearest grid point value that represents the nearest pixel that is defined by an object,
          determining, for each grid point of the set of grid points, a distance value that represents a distance the corresponding grid point is from the 3-D image sensor, and
          creating, for each grid point of the set of grid points, a two-value vector comprising the nearest grid point value and the distance value,
       access a library of movement data comprising a set of movements each having baseline data,
       compare the processed data to the baseline data of the set of movements,
       determine that at least a portion of the processed data is similar to the baseline data of one of the set of movements, and
       deem that the one of the set of movements was made by the individual.

11. The system of claim 10, wherein to analyze the 2-D image sensor data and the 3-D image sensor data, the processor is configured to:
    determine a distance and a direction of a set of possible movements depicted in the 2-D image sensor data and the 3-D image sensor data.

12. The system of claim 10, wherein to generate the processed data, the processor is further configured to:
    define changes in signals from a set of pixels and a set of frames included in the 2-D image sensor data and the 3-D image sensor data; and
    determine, based on the changes in signals, (i) a set of movements, (ii) a set of directions corresponding to the set of movements, and (iii) a set of distances corresponding to the set of movements.

13. The system of claim 10, wherein the processor is further configured to:
    project an array of infrared dots onto a field-of-view of the 3-D image sensor;
    detect returned infrared light generated by the 3-D image sensor; and
    measure a brightness of the returned infrared light to determine the distance value.

14. The system of claim 10, wherein to access the library of movement data comprising the set of movements each having the baseline data, the processor is configured to:
    locally, retrieve, from memory, the library of movements; or
    retrieve the library of movements from a remote server via network connection.

15. The system of claim 10, wherein to compare the processed data to the baseline data of the set of movements, the processor is configured to:
    determine, from the processed data, an image pattern indicative of a potential movement; and
    compare the image pattern indicative of the potential movement to the baseline data of the set of movements.

16. The system of claim 15, wherein to determine that at least the portion of the processed data is similar to the baseline data of the one of the set movements, the processor is configured to:
    calculate a metric for the image pattern indicative of the potential movement;
    normalize the metric to compensate for differences in at least one detected object; and
    determine that the normalized metric is within a threshold value of a baseline metric, from the baseline data, of the one of the set of movements.

17. The system of claim 10, wherein to deem that the one of the set of movements was completed by the individual, the processor is configured to:

record, in the memory, an indication of the one of the set of movements.

18. The system of claim 17, further comprising:
a transceiver in communication with a server via a network connection;
and wherein the processor is further configured to:
send, to the server via the transceiver, the indication of the one of the set of movements.

* * * * *